United States Patent
Shimizu et al.

Patent Number: 6,159,910
Date of Patent: Dec. 12, 2000

[54] ALUMINUM NITRIDE COMPOSITION

[75] Inventors: Toshihide Shimizu, Urayasu; Mikio Watanabe, Hasaki-machi; Tamaki Iida, Kiyose, all of Japan

[73] Assignee: Shin-Etsu Chemical Co., Ltd., Tokyo, Japan

[21] Appl. No.: 09/323,550

[22] Filed: Jun. 1, 1999

[30] Foreign Application Priority Data

Feb. 6, 1998 [JP] Japan ................................ 10-41337
Jun. 2, 1998 [JP] Japan ................................ 10-169312

[51] Int. Cl.[7] .................. C10M 103/06; C10M 125/20; C10M 133/12

[52] U.S. Cl. ............................................ 508/172; 508/563

[58] Field of Search .................................... 508/172, 563

[56] References Cited

FOREIGN PATENT DOCUMENTS 63-225507 9/1988 Japan.

*Primary Examiner*—Margaret Medley
*Assistant Examiner*—Cephia D. Toomer
*Attorney, Agent, or Firm*—Oblon, Spivak, McClelland, Maier & Neustadt, P.C.

[57] ABSTRACT

An aluminum nitride composition including an aluminum nitride powder and an aromatic amine-based condensate is provided. In the composition, the aluminum nitride may hardly undergo decomposition even under severe conditions of high temperature and high humidity, and the electrical insulating properties and high thermal conductivity inherent in aluminum nitride powder can be maintained under such severe conditions. Accordingly, this composition is useful as a durable heat-dissipating composition, in particular, as a heat-dissipating coating material, grease or sheet.

9 Claims, 1 Drawing Sheet

Fig.

ALUMINUM NITRIDE COMPOSITION

BACKGROUND OF THE INVENTION

1. Field of the Invention

This invention relates to an aluminum nitride composition which can maintain the electrical insulating properties and high thermal conductivity inherent in aluminum nitride powder even under severe conditions of high temperature and high humidity. More partricularly, it relates to an aluminum nitride composition suited for use in heat dissipation.

2. Description of the Prior Art

In electronic and electric instruments, heat-dissipating greases, heat-dissipating sheets or heat-dissipating coating materials are conventionally used in which a heat-conductive filler having electrical insulating properties have been compounded so that the heat generated in electric parts can immediately be dispersed and transmitted while ensuring electrical insulating properties.

Aluminum nitride powder is characterized by having electrical insulating properties and a high thermal conductivity, and hence widely used as a heat-conductive filler such as heat-dissipating grease.

However, such aluminum nitride powder reacts readily with water, and has a disadvantage that it has moisture resistance so greatly low as to react with atmospheric moisture even in the state it is left in the air, to become decomposed gradually. Thus, there has been a problem that the use of heat-dissipating grease, heat-dissipating sheets or heat-dissipating coating materials compounded with aluminum nitride powder causes a lowering of electrical insulating properties and thermal conductivity because of the decomposition of aluminum nitride.

In order to improve the moisture resistance of this aluminum nitride, methods are proposed in which particle surfaces of aluminum nitride powder are oxidized to provide a protective film of aluminum oxide or particle surfaces of aluminum nitride powder are coated with fused silica. Such methods, however, can not attain any sufficient moisture resistance under severe conditions of high temperature and high humidity.

It is sought to attain a sufficient moisture resistance even under such severe conditions so that the electrical insulating properties and high thermal conductivity inherent in aluminum nitride powder can be well restrained from lowering.

SUMMARY OF THE INVENTION

Accordingly, an object of the present invention is to provide an aluminum nitride composition whose aluminum nitride powder can be restrained from decomposition and which can maintain the electrical insulating properties and high thermal conductivity inherent in aluminum nitride powder even under severe conditions of high temperature and high humidity.

As a result of extensive studies made in order to achieve the above object, the present inventors have discovered that the moisture resistance of aluminum nitride powder can greatly be improved by adding and mixing an aromatic amine-based condensate in the aluminum nitride powder, thus they have accomplished the present invention.

That is, the present invention provides an aluminum nitride composition comprising an aluminum nitride powder and an aromatic amine-based condensate.

DESCRIPTION OF THE PREFERRED EMBODIMENTS

The present invention will be described below in detail.

The aluminum nitride composition of the present invention comprises an aluminum nitride powder and an aromatic amine-based condensate. In this composition, there are no particular limitations on the form of presence of the both components. For example, the composition may be in such a form that the particle surfaces of the aluminum nitride powder are treated with the aromatic amine-based condensate so that the aromatic amine-based condensate stands deposited on the particle surfaces of the aluminum nitride powder.

Aluminum Nitride Powder

With regard to the aluminum nitride powder used in the present invention, there are no particular limitations on its particle size and shape. It may preferably have an average particle diameter of from 0.1 to 500 $\mu$m, and particularly preferably from 0.5 to 100 $\mu$m. Here, it may preferably have such a particle size distribution that is within 0.04 to 800 $\mu$m, particularly 0.4 to 200 $\mu$m.

The aluminum nitride powder may have any particle shape of fibrous, flaky, acicular and spherical.

Aromatic Amine-based Condensate

In the present invention, the aromatic amine-based condensate may preferably be contained in an amount of from 0.001 to 500 parts by weight, and particularly from 0.01 to 200 parts by weight, based on 100 parts by weight of the aluminum nitride powder.

The aromatic amine-based condensates are exemplified by:

(A) an aromatic amine compound condensation product, (B) an alkali-treated product of the aromatic amine compound condensation product (A), (C) a higher fatty acid-treated product or aromatic carboxylic acid-treated product of the aromatic amine compound condensation product (A), and (D) an alkylation product, alkenylation product and aralkylation product of the aromatic amine compound condensation product (A). These compounds may be used singly or in combination of two or more.

As the (A) aromatic amine compound condensation product, preferably usable are those having a weight-average molecular weight in the range of from 1,000 to 50,000 in terms of polystyrene as measured by gel permeation chromatography (GPC). Those having a weight-average molecular weight less than 1,000 may less act on the aluminum nitride powder, bringing about a disadvantage that the composition has a poor moisture resistance, and are not preferable. Those having a weight-average molecular weight more than 50,000 may also less act on the aluminum nitride powder, bringing about disadvantages that the composition has a poor moisture resistance and also may dissolve in solvents so hardly as to become usable with difficulty, and are not preferable.

In the present invention, from the viewpoint of humidity resistance, the following are preferably used:

(B) the alkali-treated product of an aromatic amine compound condensation product (A), (C) the higher fatty acid-treated product or aromatic carboxylic acid-treated product of an aromatic amine compound condensation product (A), and (D) the alkylation product, alkenylation product and aralkylation product of an aromatic amine compound condensation product (A).

Further from the viewpoint of humidity resistance and prevention of a base oil from separating and diffusing (bleeding), the following are preferably used:

(C) the higher fatty acid-treated product or aromatic carboxylic acid-treated product of an aromatic amine compound condensation product (A), and (D) the alkylation product, alkenylation product and aralkylation product of an aromatic amine compound condensation product (A).

<(A) Aromatic amine compound condensation products>

The aromatic amine compound condensation products include, for example:

(1) a self-condensation product of an aromatic amine compound;

(2) a condensation product of an aromatic amine compound with an aromatic hydroxyl compound;

(3) a condensation product of an aromatic amine compound with an aromatic nitro compound; and (4) a condensation product of an aromatic amine compound with a quinone compound.

The aromatic amine compounds are exemplified by aminobenzenes such as aniline, o-, m- or p-phenylenediamine, o-, m- or p-aminophenol, o-, m- or p-chloroaniline, p-aminobenzene, 2,4-diaminoazobenzene, p-aminoacetanilide, o-, m- or p-methylaniline, N,N-dimethyl-p-phenylenediamine, 4-chloro-o-phenylenediamine, 4-methoxy-o-phenylenediamine, 2-amono-4-chlorophenol, 2,3-diaminotoluene, 2,4-diaminophenol, o-, m-, or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-hydroxyanthranylic acid, o-, m-, or p-aminobenzenesulfonic acid, 2,3-, 2,4-, 2,5-, 2,6-, 3,4- or 3,5-diaminobenzenesulfonic acid, 2-amino-1-phenol-4-sulfonic acid, and 6-amino-4-chloro-1-phenol-2-sulfonic acid; diphenylamines such as 4-aminodiphenylamine, 2-aminodiphenylamine, 4,4'-diaminodiphenylamine, 4-amino-3'-methoxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine; and aminonaphthalenes such as α-naphthylamine, β-naphthylamine, 1,5-diaminonaphthalene, 1-amino-5-hydroxynaphthalene, 1,8-diaminonaphthalene, 2,3-diaminonaphthalene, 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1,5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,6-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ acid), 2-amino-5-naphthol-7-sulfonic acid (J acid) and 1-amino-8-naphthol-3,6-disulfonic acid (H acid).

The aromatic hydroxyl compounds are exemplified by phenols and phenol derivatives, such as phenol, hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

In addition thereto, the aromatic hydroxyl compounds are exemplified by naphthols and naphthol derivatives such as α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid.

The aromatic nitro compounds are exemplified by nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

The quinone compounds include, for example, benzoquinones and derivatives thereof, such as o-, m- or p-benzoquinone, tolu-p-quinone, o-xylo-p-quinone, thymoquinone, 2-methoxybenzoquinone, gentisyl quinone, polyporic acid and ubiquinone-n; naphthoquinones and derivatives thereof, such as 6-methyl-1,4-naphthoquinone, 2-methyl-1,4-naphthoquinone, α-naphthoquinone, juglone, lawsone, plumbagin, alkannin, echinochrome A, vitamin $K_1$, vitamin $K_2$, shikonin, β,β'-dimethyl acrylshikonin, β-hydroxyisovaleroshikonin and teracrylshikonin; anthraquinones and derivatives thereof, such as tectoquinone, 3-hydroxy-2-methylanthraquinone, anthraquinone, 2-hydroxyanthraquinone, alizarin, xanthopurpurin, rubiadin, munjistin, crysophanic acid, carminic acid, kermesic acid and laccaic acid A; and phenanthrenequinones such as phenanthrenequinone.

In order to carry out the self-condensation reaction of an aromatic amine compound alone, the condensation reaction of an aromatic amine compound with an aromatic hydroxyl compound and the condensation reaction of an aromatic amine compound with an aromatic nitro compound, a mineral acid and a condensation catalyst are used. The mineral acids are exemplified by hydrochloric acid, nitric acid, hydrobromic acid, phosphoric acid and sulfuric acid. The condensation catalysts are preferably exemplified by permanganic acid and salts thereof, such as permanganic acid and potassium permanganate; chromic acid-related compounds, such as chromium trioxide, potassium dichromate and sodium chlorochromate; metal nitrates, such as silver nitrate and lead nitrate; halogens, such as iodine and bromine; peroxides, such as hydrogen peroxide, sodiumperoxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts, such as ferrous chloride, ferric chloride, copper sulfate, cuprous chloride, cupric chloride and lead acetate; ozone; and oxides, such as copper oxide, mercury oxide, cerium oxide, manganese dioxide and osmic acid. It is also effective to use hydrogen peroxide and ferrous chloride in combination.

The self-condensation reaction of an aromatic amine compound alone, the condensation reaction of an aromatic amine compound with an aromatic hydroxyl compound and the condensation reaction of an aromatic amine compound with an aromatic nitro compound may be carried out in the presence of a condensation catalyst at 100 to 350° C. for 2 to 100 hours.

The proportion of an aromatic amine compound and an aromatic hydroxyl compound or an aromatic nitro compound, which are used in the condensation reaction of an aromatic amine compound with an aromatic hydroxyl compound and the condensation reaction of an aromatic amine compound with an aromatic nitro compound, depends on the aromatic amine compound, aromatic hydroxyl compound and aromatic nitro compound and the catalyst used, the reaction time, the reaction temperature and so forth. Generally, it is preferable to use from 0.1 to 10 moles of the aromatic hydroxyl compound or the aromatic nitro compound per mole of the aromatic amine compound.

The condensation reaction of an aromatic amine compound with a quinone compound is carried out in an organic solvent medium, optionally in the presence of a condensation catalyst. The organic solvent medium preferably has a pH within the range of from 1 to 13.5 and a pH adjuster may be used without any particular limitations. Usable pH adjusters include various acidic compounds and alkali compounds. The acidic compounds are exemplified by phosphoric acid, sulfuric acid, phytic acid and acetic acid; and alkali compounds are exemplified by alkali metal compounds or ammonium compounds, such as LiOH, KOH, NaOH, $Na_2CO_3$, $Na_2SiO_3$, $Na_2HP_4$ and $NH_4OH$; and organic amine compounds, such as ethylenediamine, monoethanolamine and triethanolamine.

As the medium for the condensation reaction, organic solvents exemplified by alcohols, ketones and esters, or mixed solvents of water and hydrophilic organic solvents miscible with water are preferred. Usable hydrophilic organic solvents include, for example, alcohols, such as methanol, ethanol and propanol; ketones, such as acetone andmethyl ethyl ketone; and esters, such as methyl acetate and ethyl acetate.

The condensation catalyst may be optionally used which is exemplified by azo catalysts such as $\alpha,\alpha'$-azobisisobutylonitrile and $\alpha,\alpha'$-azobis-2,4-dimethylvaleronitrile; elementary or molecular halogens, such as iodine, bromine and chlorine; peroxides, such as hydrogen peroxide, sodium peroxide, benzoyl peroxide, perbenzoic acid and p-menthane hydroperoxide; oxygen acids or oxygen acid salts, such as iodic acid, periodic acid, potassium periodate and sodium perchlorate. Incidentally, since the quinone compound acts as a condensation catalyst, the condensation reaction of an aromatic amine compound and a quinone compound takes place even in the absence of a condensation catalyst.

The condensation reaction can be normally carried out at 20 to 200° C. for 0.5 to 100 hours.

The proportion of an aromatic amine compound and a quinone compound in the condensation reaction of the aromatic amine compound and the quinone compound depends on the sort of the aromatic amine compound, quinone compound and catalyst used, the reaction time and the reaction temperature. In the present invention, it is preferable to use from 0.1 to 10.0 mols of the quinone compound per mol of the aromatic amine compound.

<(B) Alkali-treated product of an aromatic amine compound condensation product (A)>

Component (B), the alkali-treated product of an aromatic amine compound condensation product (A) is prepared by treating the aromatic amine compound condensation product (A), which is obtained in the presence of an acidic catalyst or in an acidic medium, with an alkali.

The method for treating the aromatic amine compound. condensation product with an alkali is carried out by first dispersing the aromatic amine compound condensation product in water to prepare a 0.1 to 50 wt. % aqueous dispersion of the aromatic amine compound condensation product. Then, to the resulting dispersion is added an inorganic alkaline compound such as NaOH, KOH, $Na_2CO_3$, $NH_4OH$ or $(NH_4)_2CO_3$ in an amount of 10 to 20 parts by weight per 100 parts by weight of the aromatic amine compound condensation product and the mixture thus obtained is heat-treated at 90 to 140° C. for 0.5 to 10 hours. The amount of the alkaline compound used is to be sufficient to neutralize the acidic compound used in the condensation reaction for production for of the aromatic amine compound condensation product.

<(C) Higher fatty acid-treated product or aromatic carboxylic acid-treated product of an aromatic amine compound condensation product (A)>

Component (C), the higher fatty acid-treated product or aromatic carboxylic acid-treated product of an aromatic amine compound condensation product (A) is prepared by treating the aromatic amine compound condensation product (A) and/or the above alkali-treated product (B) of an aromatic amine compound condensation product with a higher fatty acid, an alkali metal salt or ammonium salt thereof an aromatic carboxylic acid or an alkali metal salt or ammonium salt thereof (hereinafter, referred to as "fatty acid and the like.")). The higher fatty acids include, for example, hodinic acid, palmitic acid, stearic acid, oleic acid or linolic acid. The aromatic carboxylic acids include, for example, tannic acid or shellac acid.

The method for treating the aromatic amine compound condensation product (A) with a fatty acid and the like is carried out by first mixing a fatty acid and the like in an amount of 5 to 1,000 parts by weight per 100 parts by weight of the aromatic amine compound condensation product (A) and/or (B) the alkali-treated product thereof (B). Then, the resulting mixture is heat-treated at a temperature slightly higher than the melting point of the fatty acid and the like used (about 40 to 250° C.). Further, after the treated product thus obtained is optionally washed with water, the treated product is charged into water to allow it to precipitate. Thus, the higher fatty acid-treated product or aromatic carboxylic acid-treated product (C) of an aromatic amine compound condensation product is produced.

Incidentally, a solvent such as dioxane, N,N-dimethylformamide, 1,3-dimethyl-2-imidazolidinone, N,N-dimethylacetamide and N-methyl-2-pyrrolidone is preferably used at the step of mixing (A) the aromatic amine compound condensation product and/or (B) the alkali-treated product thereof with the fatty acids and the like, since the solubility of the resulting mixture is increased and the treatment with a higher fatty acid or an aromatic carboxylic acid is more sufficiently carried out.

Among the higher fatty acid-treated product and the aromatic carboxylic acid-treated product exemplified above, preferred is the higher fatty acid-treated product.

<(D) Alkylation product, alkenylation product and aralkylation product of an aromatic amine compound condensation product (A)>

Component (D), the alkylation product, alkenylation product and aralkylation product of an aromatic amine compound condensation product (A) can be prepared by reacting the aromatic amine compound condensation product (A) and/or the alkali-treated product thereof (B) with an alkyl halide, alkenyl halide, aralkyl halide or a mixture thereof in an organic solvent.

The alkyl halide used includes, for example, n-propyl bromide, n-butyl chloride, n-butyl bromide, isobutyl bromide, 2-ethylhexyl bromide, n-octyl bromide, n-octyl chloride, dodecyl bromide, cetyl bromide, stearyl bromide and stearyl chloride.

The alkenyl halide includes, for example, allyl chloride, allyl bromide, isopropenyl chloride, isopropenyl bromide, oleyl chloride and oleyl bromide.

The aralkyl halide includes, for example, benzyl chloride, benzyl bromide, β-phenylethyl chloride, β-phenylethyl bromide, p-methylbenzyl chloride, p-methylbenzyl bromide, p-ethylbenzyl chloride, p-ethylbenzyl bromide, cinnamyl chloride, cinnamyl bromide, p-octylbenzyl chloride, p-octylbenzyl bromide, styryl chloride, styryl bromide, phenetyl chloride and phenetyl bromide.

The organic solvent used in the above reaction includes, for example, dioxane, N,N-dimethylformamide, dimethyl sulfoxide, dimethylaniline, dimethylbenzylimine, nitrobenzene, N,N-dimethylacetamide, 1,3-dimethyl-2-imidazolidinone and N-methyl-2-pyrrolidone.

The reaction temperature is generally in the range of 10 to 200° C. During dropwise-addition of a halide, however, preferably the reaction mixture is kept at a temperature of the boiling point of the solvent or less. After the dropwise-addition, preferably the reaction mixture is heated to a prescribed temperature for proceeding the reaction.

Although the reaction time can be made short by raising the reaction temperature, it generally ranges form 1 to 10 hours after the dropwise-addition of the halide.

Further, preferably an alkaline compound is used in the above reaction. The alkaline compound includes, for example, LiOH, KOH, NaOH, $Na_2CO_3$, $Na_2SiO_3$, $Na_2HPO_4$, $Li_2CO_3$, $K_2CO_3$ and $CaCO_3$.

Alkylation, alkenylation or aralkylation of the aromatic amine compound condensation product (A) is carried out by first dispersing or dissolving the aromatic amine compound condensation product (A) and/or the alkali-treated product thereof (B) in said solvent to prepare a 0.01 to 20 wt. % dispersion or solution and then dropwise adding thereto the above halide in an amount of 10 to 300 parts by weight, preferably 50 to 150 parts by weight, per 100 parts by weight of the condensation product (A) and/or the alkali-treated product (B). Further, the alkali compound stated above is optionally added in an amount of 10 to 500 parts by weight, preferably 30 to 300 parts by weight, per 100 parts by weight of the condensation product (A) and/or the alkali-treated product (B). Generally in the case of adding the alkali compound, it is preferably added prior to the dropwise-addition of the halide. Thereafter, the reaction mixture is heated to a prescribed temperature and then reacted for a prescribed time. After the end of reaction, the resulting reaction mixture is cooled and charged into water to allow to precipitate and/or to disperse the reaction product, followed by filtering, washing with water, and drying. Thus, the alkylation, alkenylation or aralkylation product is produced.

Preparation and Use of Aluminum Nitride Composition

The aluminum nitride composition of the present invention is obtained by uniformly mixing the aluminum nitride powder, the aromatic amine-based condensate and optionally other components such as solvents described later, depending on its use. When these are mixed, the aluminum nitride powder is usually surface-treated with the aromatic amine-based condensate, so that aluminum nitride powder on the particle surfaces of which the aromatic amine-based condensate has been deposited is obtained.

In the aluminum nitride composition of the present invention, thus obtained, the aluminum nitride powder can be restrained from its decomposition even under severe conditions of high temperature and high humidity. Thus, it is preferably put into uses utilizing the electrical insulating properties and high thermal conductivity inherent in aluminum nitride powder, e.g., as heat-dissipating compositions such as heat-dissipating coating materials, heat-dissipating sheets or heat-dissipating grease.

Other Components

To the composition of the present invention, at least one component other than the aluminum nitride powder and aromatic amine-based condensate may be added according to uses so long as the object and effect of the present invention are not damaged.

For example, when used in heat-dissipating coating materials, the composition of the present invention may be incorporated with a resin component including thermoplastic resins such as acrylate resin, vinyl chloride/vinyl acetate copolymer, vinyl chloride/vinylidene chloride copolymer, ethylene/vinyl acetate copolymer, vinyl acetate resin, polyvinyl butyral resin, silicone resin, polyvinyl alcohol resin, synthetic rubbers and shellac resin; and thermosetting resins such as polyurethane, epoxy resin, phenol resin, melamine resin, alkyd resin and thermosetting acrylic resin. Such a resin may be added in an amount of from 1 to 500 parts by weight, and preferably from 5 to 100 parts by weight, based on 100 parts by weight of the aluminum nitride powder.

A solvent may or may not be contained in such coating materials. When contained, an organic solvent may be added which may include aliphatic hydrocarbons such as hexane; aromatic hydrocarbons such as toluene, xylene, cyclohexanone and tetrahydrofuran; esters such as ethyl acetate and butyl acetate; ketones such as methyl isobutyl ketone; alcohols such as methanol, ethanol and propyl alcohol; formamides such as N,N-dimethylformamide and N,N-diethylformamide; acetamides such as N,N-dimethylacetamide and N,N-diethylacetamide; and other organic solvents such as dioxane, N-methyl-2-pyrrolidone, 1,3-dimethyl-2-imidazolidinone and isophorone. The organic solvent may be added in the range of 96% by weight or less based on the total weight of the composition.

When used in, e.g., heat-dissipating sheets and heat-dissipating grease, the composition of the present invention may be incorporated with a resin or oil component including silicone oils such as dimethylsilicone oil, methylphenylsilicone oil, long-chain alkyl-modified silicone oils, trifluoropropylmethylsilicone oil, chlorophenyl-group-modified silicone oils, epoxy-modified silicone oils and silanol-group-modified silicone oils; silicone gel; hydrocarbon oils such as paraffin type hydrocarbon oils, naphthene type hydrocarbon oils and aromatic hydrocarbon oils; polyalkylene glycols such as polyethylene glycol and polypropylene glycol; diesters such as di-2-ethylhexyl sebacate; polyol esters such as trimethylolpropane ester; phosphates such as tricresyl phosphate; polyphenyl ethers such as m-bis(m-phenoxyphenoxy)benzene; and fluorine oils such as chlorofluorocarbon.

In addition to the thermoplastic resin, thermosetting resin and oil exemplified above, the composition of the present invention may optionally further be incorporated with additives such as a surface-active agent, a curing agent, a curing accelerator, a consistency-providing agent, an oiliness improver, an antioxidant, a tackifier, a vulcanizing agent, a thixotropic agent, a flame retardant, a release agent and an inorganic additive.

Production of Condensation Products

Condensation products A-1, A-2, A-3 and A-4 were produced by the condensation reactions as mentioned below. In each example, the molecular weight of the condensation product obtained was measured in the following way.

Measurement of Molecular Weight

Weight-average molecular weight in terms of polystyrene was measured by gel permeation chromatography (GPC) under the following measurement conditions.

Columns:

Guard column:

Tradename: slim-pack GPC-800DP, manufactured by Shimadzu Corporation.

Analytical columns:

Tradename: slim-pack GPC-803D, 802D, manufactured by Shimadzu Corporation.

Mobile phase: 10 mM LiBr/DMF

Flow rate: 1.0 ml/min

Detector: RI

Temperature: 60° C.

Further, alkali-treated products B-1 and B-3, and higher aliphatic fatty acid-treated products C-1 and C-3 were produced using the condensation products A-1 and A-3 obtained, and an aralkylation product D-3 was produced using the alkali-treated product B-3 obtained.

Production of Condensation Product A-1

Into a pressure resistant reaction vessel, 100 moles (10.9 kg) of p-aminophenol and 0.99 kg (9.5 moles as HCl) of 30% hydrochloric acid were charged, and the temperature of the resulting mixture was raised to 169° C. When the temperature reached 169° C., 18 liters of xylene was slowly added for the purpose of removing the water generated during condensation reaction as an azeotropic mixture. Then, the temperature of the reaction mixture was raised to 222° C. and reacted at this temperature for 3 hours. The mixed vapor of xylene and water generated during reaction was removed and the internal pressure was kept at 150 kPa. After reacting for 3 hours, the reaction mixture was cooled. The reaction product obtained was solid. Next, the reaction product was pulverized into fine particles, followed by washing with water, filtering and drying to obtain Condensation Product A-1. This condensation product had a weight-average molecular weight of 2,500.

Production of Condensation Product A-2

Into a pressure resistant reaction vessel, 100 moles (10.8 kg) of m-phenylenediamine, 200 moles (22.0 kg) of resorcinol and 1.04 kg (10 moles as HCl) of 35% hydrochloric acid were charged, and the temperature of the resulting mixture was raised to 305° C. Immediately when the temperature of the mixture in the reaction vessel reached 305° C., the reaction mixture was cooled. The water produced during the rise in temperature and the reaction was removed, and the internal pressure was kept at 150 kPa. After cooling, a condensation product of m-phenylenediamine was obtained, which was pulverized to obtain as Condensation Product A-2. This condensation product had a weight-average molecular weight of 3,000.

Production of Condensation Product A-3

A mixture of 100 moles of aniline, 31 moles of hydrochloric acid, 22.7 moles of nitrobenzene and 0.103 mole of ferric chloride was heated at 60° C. for 6 hours in a reaction vessel. Then, the temperature was raised to 180 to 185° C. to react the mixture at the temperature for 15 hours while water was evaporated off. During the reaction, a part of aniline and a part of nitrobenzene together with the water were evaporated off. The evaporated aniline and nitrobenzene were recovered and recycled to the reaction vessel. Next, the internal pressure was further raised to 200° C. and the reaction mixture was heated at this temperature for 5 hours.

The thus obtained reaction mixture in a melted form was charged into a dilute hydrochloric acid and heated to 60° C. for 3 hours, followed by hot-filtering to remove unreacted aniline. The reaction mixture was further washed 5 to 6 times with water in order to remove excess hydrochloric acid and then dried to obtain Condensation Product A-3. This condensation product had a weight-average molecular weight of 15,000.

Production of Condensation Product A-4

Into a pressure resistant reaction vessel, 30,000 moles (960 kg) of methanol, 100 moles (15.8 kg) of 1,8-diaminonaphthalene, 50 moles (5.4 kg) of p-benzoquinone were charged. To the resulting mixture, 159 moles (20 kg) of pyrogallol was added and reacted at 60° C. for 20 hours. Then, 1,000 kg of water was charged into the reaction mixture and the resulting condensate was settled. The sediment thus obtained was filtered, washed and dried to obtain Condensation Product A-4. This condensation product had a weight-average molecular weight of 12,000.

Production of Condensation Product B-1 (Alkali-treated Product)

In 5.0 kg of water, 1.0 kg of the above Condensation Product A-1 was dispersed and 0.1 kg of NaOH was added thereto. Thereafter, the resulting mixture was heated up to 130° C. and heat-treated at this temperature for 2 hours. After cooling, the liquid reaction product was filtered, washed with water, and dried to obtain Alkali-treated Product B-1.

Production of Condensation Product B-3 (Alkali-treated Product)

In 5.0 kg of water, 1.0 kg of the above Condensation Product A-3 was dispersed and 0.2 kg of NaOH was added thereto. Thereafter, the resulting mixture was heated up to 100° C. and heat-treated at this temperature for 4 hours. After cooling, the reaction product was filtered, washed with water, and dried to obtain Alkali-treated Product B-3.

Production of Condensation Product C-1 (Higher fatty acid-treated Product)

To 1.0 kg of the above Condensation Product A-1, 1.0 kg of lithiumstearatewas added. The resulting mixture was heated up to 230° C. and treated at this temperature for 1 hour. After cooling, the reaction product obtained was pulverized into fine particles, followed by washing with water, filtering and drying to obtain Higher fatty acid-treated Product C-1.

Production of Condensation Product C-3 (Higher fatty acid-treated Product)

To 0.5 kg of the above Condensation Product A-3, 1.0 kg of oleic acid was added. The resulting mixture was heated up to 100° C. and treated at this temperature for 2 hours. After cooling, the reaction product was pulverized into fine particles, to obtain Higher fatty acid-treated Product C-3 in the form of fine particles.

Production of Condensation Product D-3 (Aralkylation Product)

Into a reaction vessel provided with a stirrer, a dropping funnel, a condenser, etc., 1.0 kg of the above Alkali-treated Product B-3 was charged and then 10 kg of dimethylformamide was charged, and subsequently stirring was started.

Next, after adding 1.0 kg of anhydrous potassium carbonate as an alkali agent, the resulting mixture was heated up to 80° C. and kept at this temperature. To the mixture, 250 g of benzyl chloride was dropwise added over 2 hours, and stirring was kept at 80° C. for 1 hour.

Then, the reaction mixture was heated up to 120° C. and stirred at this temperature for 2 hours, followed by cooling. The reaction mixture was charged into 90 liters of water. After the resulting mixture was stirred for 1 hour, it was filtered, washed with water, and dried to obtain Aralkylation Product D-3.

Example 1

(Experiment Nos. 1 to 10)

In Experiment Nos. 1 to 9, 1 g of each aromatic amine-based condensate of the type shown in Table 1 was dissolved in 100 g of methanol, followed by addition of 50 g of aluminum nitride powder (average particle diameter: 3 μm), and the mixture obtained was stirred for 20 minutes to treat the aluminum nitride powder. After the treatment, the mixture was filtered, followed by drying under reduced pressure to obtain an aluminum nitride powder treated with the aromatic amine-based condensate. In each Experiment, the weight of the aluminum nitride powder treated with the aromatic amine-based condensate was measured and was found to be 50.01, showing a gain of 0.01 g.

Next, to 100 g of water, 2 g of the aluminum nitride powder treated with the aromatic amine-based condensate was added, and the pH of the resultant dispersion of the aluminum nitride powder treated with the aromatic amine-based condensate was measured in its changes with time at intervals of 10 hours during up to 50 hours and 100 hours each while stirring the dispersion. Results obtained are shown in Table 1.

Experiment No. 10 is a comparative example in which an unreated aluminum nitride powder, not treated with the aromatic amine-based condensate, islused.

As can be seen from the results of changes with time of the pH, the aluminum nitride powder treated with the aromatic amine-based condensate is restrained from its decomposition and maintains its water resistance (aluminum nitride reacts with water and is decomposed to produce ammonia, and hence the pH increases with decomposition of aluminum nitride).

TABLE 1

Water Resistance of Aluminum Nitride Powder Treated with Aromatic amine-based Condensate

| Experiment No. | Aromatic amine-based condensate used in treatment of aluminum nitride powder | pH (immediately after addition) | PH (after 10 hrs.) | PH (after 20 hrs.) | PH (after 30 hrs.) | PH (after 40 hrs.) | PH (after 50 hrs.) | PH (after 100 hrs.) |
|---|---|---|---|---|---|---|---|---|
| 1 | A-1 | 6.5 | 6.7 | 7.1 | 7.3 | 7.5 | 7.7 | 8.9 |
| 2 | A-2 | 6.6 | 6.6 | 6.8 | 7.0 | 7.3 | 7.6 | 8.9 |
| 3 | A-3 | 6.5 | 6.8 | 7.1 | 7.4 | 7.8 | 8.2 | 9.8 |
| 4 | A-4 | 6.9 | 7.0 | 7.2 | 7.4 | 7.6 | 7.8 | 9.0 |
| 5 | B-1 | 6.8 | 6.9 | 7.0 | 7.1 | 7.2 | 7.3 | 8.5 |
| 6 | B-3 | 6.7 | 6.7 | 6.8 | 6.9 | 7.0 | 7.1 | 8.2 |
| 7 | C-1 | 6.7 | 6.8 | 6.9 | 6.9 | 7.0 | 7.0 | 7.5 |
| 8 | C-3 | 6.6 | 6.7 | 6.8 | 6.8 | 6.8 | 6.8 | 7.0 |
| 9 | D-3 | 6.5 | 6.5 | 6.5 | 6.5 | 6.6 | 6.6 | 6.7 |
| 10* | Untreated | 7.2 | 8.4 | 8.9 | 9.8 | 10.4 | 10.9 | 11.6 |

(Remarks)
*Comparative example

Example 2

(Experiment Nos. 11 to 20)

In Experiment Nos. 11 to 19, 3 g of each aromatic amine-based condensate of the type shown in Table 2, 10 g of polyvinyl butyral, 30 g of aluminum nitride powder (average particle diameter: 3 μm), 0.1 g of a fluorine alkyl ester surface-active agent (FC-430, trade name; available from Sumitomo 3M Limited) and 100 g of tetrahydrofuran were put into a ball mill, and were mixed for 10 hours to produce a heat-dissipating coating material.

Next, the heat-dissipating coating material thus obtained was coated on a glass plate so as to be in a thickness of about 50 μm after drying, followed by drying at 50° C. for 1 hour in a vacuum dryer. Subsequently, the glass plate thus coated with the heat-dissipating coating material was taken out and cooled. After the cooling, a coating film of the heat-dissipating coating material was peeled from the glass plate to obtain a heat-dissipating coating film. Then, on this heat-dissipating coating film, its thermal conductivity and surface resistivity in its changes with time were measured. Results obtained are shown in Table 2.

Experiment No. 20 is a comparative example in which experiment was made in the same manner as in Experiments Nos. 11 to 19 except that the heat-dissipating coating material was prepared without addition of the aromatic amine-based condensate.

Measurement of Thermal Conductivity

Thermal conductivity (W/mK) of the film was measured with a sheet thermal conductivity meter (KEMTHERM QTM-500, trade name; manufactured by Kyoto Denshi Kogyo K. K.) at 25° C.

Measurement of Surface Resistivity

Surface resistivity (Ω) of the film was measured with an ultra insulation resistivity meter (TR8601, trade name; manufactured by Advantest Co.) at 25° C.

Measurement of Thermal Conductivity and Surface Resistivity in Their Changes with Time 1) The film was left for 24 hours in a thermo-hygrostatic chamber kept at 25° C. and 50% humidity, and thereafter its thermal conductivity and surface resistivity were measured (the measurements are regarded as initial values) in the same manner as the above. Results obtained are shown in Table 2.

2) The film was left for 500 hours in a thermo-hygrostatic chamber kept at 100° C. and 80% humidity, and thereafter its thermal conductivity and surface resistivity were measured in the same manner as the above. Results obtained are shown in Table 2.

TABLE 2

| Experiment No. | Aromatic amine-based condensate added | Thermal conductivity (W/mk) | | Surface resistivity (Ω) | |
|---|---|---|---|---|---|
| | | Initial value | Thermo-hygrostatic 500-hour treatment | Initial value | Thermo-hygrostatic 500-hour treatment |
| 11 | A-1 | 0.30 | 0.30 | $10^{16}$ | $10^{16}$ |
| 12 | A-2 | 0.31 | 0.30 | $10^{16}$ | $10^{16}$ |
| 13 | A-3 | 0.32 | 0.31 | $10^{16}$ | $10^{16}$ |
| 14 | A-4 | 0.31 | 0.30 | $10^{16}$ | $10^{16}$ |
| 15 | B-1 | 0.30 | 0.29 | $10^{16}$ | $10^{16}$ |
| 16 | B-3 | 0.32 | 0.31 | $10^{16}$ | $10^{16}$ |
| 17 | C-1 | 0.31 | 0.31 | $10^{16}$ | $10^{16}$ |
| 18 | C-3 | 0.32 | 0.32 | $10^{16}$ | $10^{16}$ |
| 19 | D-3 | 0.32 | 0.32 | $10^{16}$ | $10^{16}$ |
| 20* | — | 0.31 | 0.20 | $10^{16}$ | $10^{13}$ |

(Remarks)
*: Comparative example

Example 3
(Experiment Nos. 21 to 29)
(Heat-dissipating grease)

43% by weight of polyphenyl ether oil with a viscosity of 290 mm$^2$/sec at 40° C. as a base oil, 50% by weight of aluminum nitride powder (average particle diameter: 3 μm) as a heat-conductive powder, 5% by weight of lithium 12-hydroxystearate as a consistency-providing agent and 2% by weight of an aromatic amine-based condensate (but not added in Experiment No. 21) were stirred and mixed for 1 hour by means of a mixing stirrer, and the mixture obtained was kneaded with a three-roll mill. The consistency (cone penetration), degree of oil separation, base oil diffusion rate and thermal conductivity of the resultant composition were measured. Results obtained are shown in Table 3. These properties were measured in the following way.

(1) Oil separation degree test (JIS K2220)

About 10 g of the composition is put on 60-mesh conical wire cloth. This is hung down in a beaker made of glass, and is left for 24 hours in a thermostatic chamber kept at a temperature of 150° C. Thereafter, the quantity of oil dropped in the beaker is measured to determine the rate of separation with respect to the composition, and this is regarded as degree of oil separation.

(2) Consistency test (JIS K2220)

The composition is put in a prescribed mixer, and is kept at 25° C. Thereafter, this is reciprocatingly mixed 60 times, and immediately thereafter, its consistency is measured. The lower the consistency is, i.e., the softer the composition is, the more the degree of oil separation and amount of exudation tend to increase.

(3) Base oil diffusion evaluation test

Figure 1:
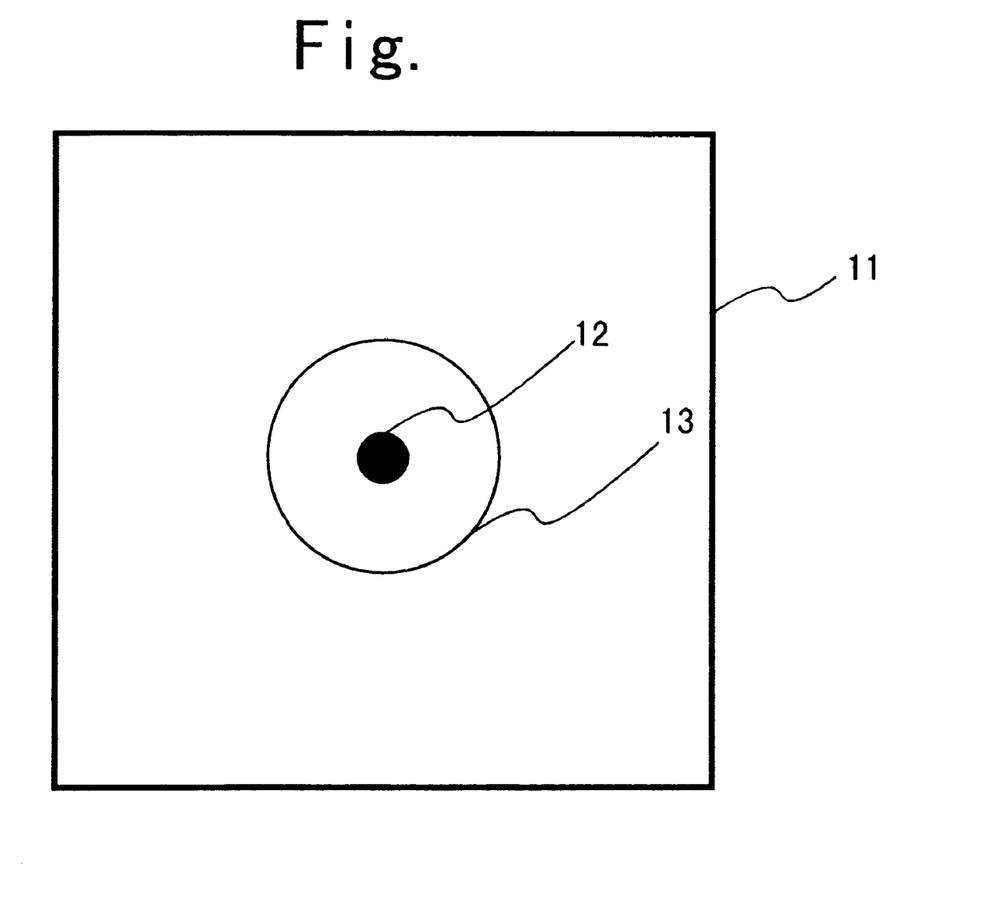
FIG. 1 illustrates a method for a base oil diffusion evaluation test made in Example.

A test method will be described with reference to FIG. 1. The composition is made to adhere to the tip of a stainless steel rod of 2 mm diameter, and about 0.2 g of the composition (12) is put on an aluminum nitride sheet (0.6 mm thick, 30×30 mm) with a surface roughness (Ra) of 0.06 μm, in the shape of a round hill (about 4 mm in diameter). This is left for 24 hours in a thermostatic chamber kept at a temperature of 150° C., and thereafter the diameter (mm) of the part (13) where the base oil has exuded and diffused is measured, and its diffusion rate is determined from the following expression. Diffusion rate (%)=[(diffusion width—round-hill diameter)/round-hill diameter]×100

(4) Measurement of Thermal Conductivity

Conductivity of the composition is measured at 25° C. with a quick thermal conductivity meter (KEMTHERM QTM-D3, trade name; manufactured by Kyoto Denshi Kogyo K. K.). Measured in the following way: The composition is sandwiched in a thickness of about 0.5 mm between polyvinylidene chloride films (10 μm thick each), and this is put on three kinds of reference plates having different thermal conductivity. A probe is gently put thereon to measure thermal conductivity of the composition on each reference plate. Deviation on thermal conductivities of the three kinds of reference plates is determined, and the thermal conductivity of the composition is determined by interpolation, from a point of intersection between the thermal conductivity of the reference plate and the deviation.

TABLE 3

| | Experiment No. | 21* | 22 | 23 | 24 | 25 | 26 | 27 | 28 | 29 |
|---|---|---|---|---|---|---|---|---|---|---|
| Compounding: | Base oil(pbw) | 45 | 43 | 43 | 43 | 43 | 43 | 43 | 43 | 43 |
| | Aluminum nitride powder (pbw) | 50 | 50 | 50 | 50 | 50 | 50 | 50 | 50 | 50 |
| | Consistency-providing agent (pbw) | 5 | 5 | 5 | 5 | 5 | 5 | 5 | 5 | 5 |
| | Aromatic amine-based condensate (pbw) | — | A-1 2 | A-3 2 | A-4 2 | B-1 2 | B-3 2 | D-3 2 | C-1 2 | C-3 2 |
| Physical properties: | Consistency (25° C.) | 220 | 280 | 290 | 275 | 272 | 266 | 293 | 285 | 290 |
| | Degree of oil separation (wt. %) | 5.1 | 0 | 0 | 0 | 0 | 0 | 0 | 0 | 0 |
| | Diffusion Rate (%) | 105.0 | 1.7 | 2.6 | 2.1 | 1.8 | 1.5 | 0 | 0 | 0 |
| | Thermal conductivity (W/mk) | 1.55 | 1.60 | 1.62 | 1.58 | 1.69 | 1.59 | 1.62 | 1.60 | 1.64 |

(Remarks)
*Comparative example

As described above, in the aluminum nitride composition of the present invention, the aluminum nitride powder is restrained from decomposition even under severe conditions of high temperature and high humidity, and can maintain the electrical insulating properties and high thermal conductivity inherent in aluminum nitride powder even under such severe conditions. Accordingly, this composition can be suited for its use as a heat-dissipating composition in heat-dissipating coating materials, heat-dissipating grease and heat-dissipating sheets. In particular, when used in heat-dissipating sheets and heat-dissipating grease, it can obtain the effect of restraining the base oil from separation or diffusion (exudation).

What is claimed is:

1. An aluminum nitride composition comprising an aluminum nitride powder and an aromatic amine-based condensate, wherein said aromatic amine-based condensate is present in an amount of 0.001 part by weight to 500 parts by weight based on 100 parts by weight of the aluminum nitride powder.

2. The composition of claim 1, wherein said aromatic amine-based condensate stands deposited on the particle surfaces of said aluminum nitride powder.

3. The composition of claim 1, wherein said aromatic amine-based condensate is selected from the group consisting of:

(A) an aromatic amine compound condensation product;

(B) an alkali-treated product of the (A) aromatic amine compound condensation product;

(C) a higher fatty acid-treated product or aromatic carboxylic acid-treated product of the (A) aromatic amine compound condensation product; and (D) an alkylation product, alkenylation product or aralkylation product of the (A) aromatic amine compound condensation product.

4. The composition of claim 3, wherein said aromatic amine compound condensation product has a weight-average molecular weight of from 1,000 to 50,000.

5. The composition of claim 1, wherein said aluminum nitride powder has an average particle diameter of from 0.1 $\mu$m to 500 $\mu$m.

6. The composition of claim 1, wherein said aromatic amine-based condensate is present in an mount of from 0.01 part by weight to 200 parts by weight based on 100 parts by weight of the aluminum nitride powder.

7. The composition of claim 1, which further comprises a thermoplastic resin or a thermosetting resin.

8. The composition of claim 7, which further comprises an organic solvent.

9. The composition of claim 1, which further comprises an oil component and is in the form of grease.

* * * * *

UNITED STATES PATENT AND TRADEMARK OFFICE
CERTIFICATE OF CORRECTION

PATENT NO. : 6,159,910
DATED : December 12, 2000
INVENTOR(S) : Toshihide Shimizu, et al.

It is certified that error appears in the above-identified patent and that said Letters Patent is hereby corrected as shown below:

Title page
Item [30], the Foreign Application Priority Data is listed incorrectly. Item [30] should read as follows:

[30]  Foreign Application Priority Data

Jun. 2, 1998   [JP]   Japan......................... 10-169312

Signed and Sealed this

Eighteenth Day of September, 2001

Attest:

NICHOLAS P. GODICI
*Acting Director of the United States Patent and Trademark Office*

*Attesting Officer*